Figure 1:
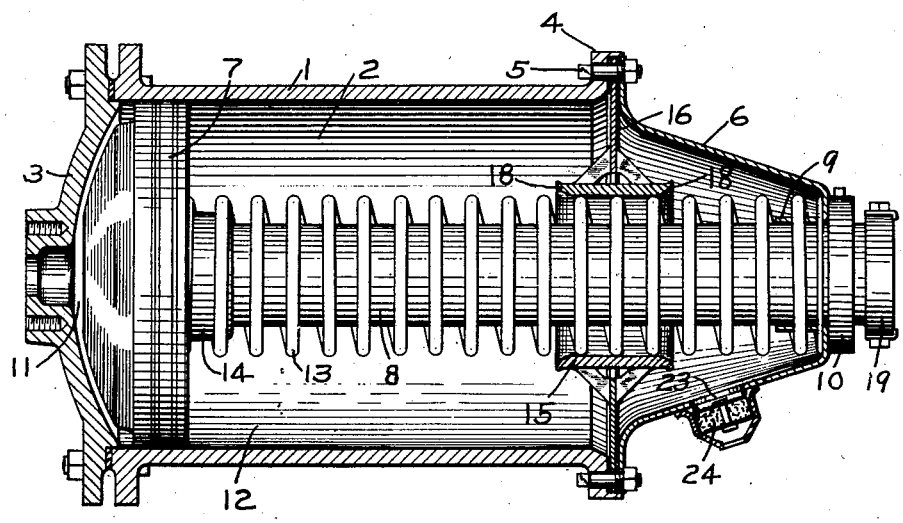

Nov. 17, 1942.  G. C. FARMER  2,302,435
BRAKE CYLINDER DEVICE
Filed Aug. 31, 1940

INVENTOR
GEORGE C. FARMER
BY
ATTORNEY

Patented Nov. 17, 1942

2,302,435

UNITED STATES PATENT OFFICE 2,302,435

BRAKE CYLINDER DEVICE

George C. Farmer, Chicago, Ill., assignor to The Westinghouse Air Brake Company, Wilmerding, Pa., a corporation of Pennsylvania Application August 31, 1940, Serial No. 355,019

8 Claims. (Cl. 60—62.6)

This invention relates to fluid pressure motors and more particularly to brake cylinder devices of the type employed in connection with fluid pressure brake systems for applying the brakes on vehicles.

The usual brake cylinder device embodies a casing and a piston mounted for reciprocation therein. The piston has a rod projecting from one face through a bore or bearing provided in a non-pressure head which is secured to one end of the casing. A relatively long coil release spring encircling the piston rod bears at one end against the non-pressure head and at the opposite end against the piston. This spring is under compression and is provided to move the piston and rod to their usual brake release position. At the opposite face of the brake cylinder piston is a pressure chamber to which fluid under pressure is adapted to be supplied for moving the piston and rod against the release spring for applying the brakes on the vehicle.

In order to prevent foreign matter from entering the non-pressure chamber at the spring side of the piston through the bore in the non-pressure head in which the piston rod operates, and also to maintain the periphery of said rod which slides in said bore free of corrosion and foreign matter and thereby in a smooth condition, it is customary to secure to the non-pressure head one or more scraper rings which encircle and bear against the outer periphery of the rod. At times felt rings are also secured to the non-pressure head for engagement with the periphery of the piston rod and these rings are provided with lubricant for lubricating the rod as it slides through the bore in the non-pressure head in order to minimize wear of the contacting parts.

The piston release spring is supported only at its opposite ends and is provided with an inside diameter which is considerably greater than the outside diameter of the piston rod in order to prevent the spring engaging said rod. However, the spring is relatively long and being supported only at its ends not only normally tends to sag intermediate its ends in the direction of the piston rod but is also free to vibrate radially and is liable to buckle when being compressed in applying the brakes.

When a vehicle is in motion the brake cylinder release spring may vibrate radially to an extent which varies with the vehicle speed, and if there is any sag in the spring such vibration may cause the spring to hammer against the piston rod at relatively low vehicle speeds. At the high speeds at which certain of the present day high speed trains operate however such vibration may be obtained as to cause the spring to hammer against the piston rod even though the spring normally has substantially no sag. The vibration of the spring against the piston rod may cause grooves or ridges to be worn in the smooth peripheral surface thereof, while in case a spring is buckled against the rod when compressed in applying and releasing the brakes on a vehicle the rod is liable to be cut or scored. Both effects have been observed in service.

Any damage to the peripheral surface of brake cylinder piston rods, regardless of the cause, is very undesirable since it not only tends to open up air flow channels between the piston rod and the scraper or felt rings in the pressure head, through which foreign matter from the atmosphere may enter the spring chamber and cause scorings of the piston and cylinder wall engaged thereby, but such damage may also result in cutting, breaking or otherwise damaging the metal scraper rings or tearing of the felt rings out of place. Excessive wear of the piston rod and of the bearing in the non-pressure head engaged by said rod may also result and therefore require premature repair to the brake cylinder device or replacement thereof.

The principal object of the invention is therefore the provision of means for at all times supporting the release spring in a brake cylinder device out of contact with the piston rod so as to obviate the above described difficulties.

Other objects and advantages will be apparent from the following more detailed description of the invention.

Figure 2:
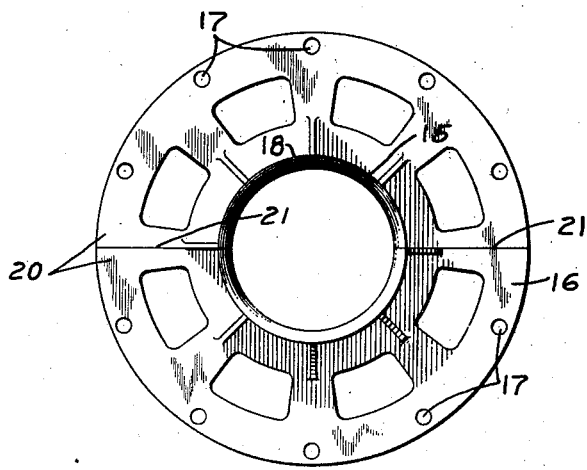

In the accompanying drawing: Fig. 1 is a longitudinal sectional view of a brake cylinder device embodying the invention; and Fig. 2 is an end view of a spring support member embodied in the brake cylinder device shown in Fig. 1.

As shown in the drawing, the brake cylinder device comprises a cylindrical casing 1 having a bore 2 one end of which is closed by a pressure head 3 in the usual manner. The opposite end of the casing is provided with an out-turned annular flange 4 and secured to this flange by bolts 5 is the large end of a frustro-conical shaped non-pressure head 6. A piston 7 is slidably mounted in the bore 2 and has projecting from one face a piston rod 8 which extends through a bearing 9 in the non-pressure head. Encircling the rod and having sliding contact with the peripheral surface thereof is a protecting device 10 which is secured to the outer end face of the non-pressure head 6. The device 10 may be of any suitable structure for lubricating the rod and for preventing entrance of foreign matter from the atmosphere along the rod through the bearing 9 to the interior of the non-pressure head and thereby to the bore 2 in the casing. The non-pressure head 6 is provided with the usual breather opening 23 through which air may freely flow to and from a non-pressure chamber 12 upon reciprocation of piston 7 in bore 2, and secured over this opening is a strainer device 24 for excluding dirt from said chamber.

The piston 7 has at its opposite face a pressure chamber 11 to which fluid under pressure is adapted to be supplied in any desired manner for effecting movement of said piston and thereby of the piston rod 8 in the direction of the right-hand as viewed in the drawing. For moving the piston and rod in the opposite direction upon the release of fluid under pressure from chamber 11 a release spring 13 is provided in the non-pressure chamber 12. This spring is under compression and one end bears against the non-pressure head 6 while the opposite end bears against the piston 7.

The spring 13 is of the usual coil type encircling the rod 8 and has an internal diameter exceeding the outside diameter of the rod 8. The end of the spring engaging the piston 7 is supported on a boss 14 projecting from the piston in coaxial relation with the rod 8 while the opposite end of the spring is supported by the smaller end of the non-pressure head 6 in substantial concentric relation with the rod 8.

In order to maintain the intermediate portion of spring 13 in substantial concentric relation with the piston rod 8 and thus prevent the spring from sagging or buckling into contact with said rod and causing damage to same, as above described, there is provided a sleeve 15 which encircles the spring and which has an inside diameter slightly greater than the outside diameter of the spring to allow free movement of the spring through the sleeve. This sleeve is encircled by and is preferably formed integral with a concentrically arranged perforated ring 16 the outer edge of which is disposed between the casing flange 4 and the larger end of non-pressure head 6, said edge being provided with suitable apertures 17 through which the bolts 5 extend for rigidly supporting the ring 16 and thereby the sleeve 15 in a fixed position in concentric relation with the piston rod 8. The sleeve will thus act to support the release spring 13 against sagging or buckling in all directions and consequently will maintain said spring in substantial concentric relation with the rod 8 so as to avoid the difficulties above described. The sleeve 15 is provided at each of its opposite ends with an outturned annular flange 18 for guiding the spring 13 into the sleeve upon reciprocation of the piston 7 to thereby insure free operation of the spring through said sleeve.

Secured to the outer end of piston rod 8 beyond the protecting device 10 is the usual stop ring 19 which upon removal of bolts 5 is adapted to engage said protecting device to maintain the non-pressure head 9 assembled on the piston rod 8 when said piston rod and non-pressure head are removed from the casing 1 for lubrication or repair. In order that the spring support means including sleeve 15 and ring 16 may be applied to the brake cylinder device when these parts are removed, said sleeve and ring are preferably made in two complementary sections for mounting around the spring 13, the lines of division between the two sections being indicated by the reference numerals 21 in Fig. 2. For application to new brake cylinders or to cylinders in which the non-pressure head 6 is removed from the piston rod 8, the sleeve 15 and ring 16 may be made in one integral piece as will be apparent.

While one illustrative embodiment of the invention has been described in detail, it is not the intention to limit the scope to that embodiment or otherwise than by the terms of the appended claims.

Having now described my invention, what I claim as new and desire to secure by Letters Patent, is:

1. A fluid pressure motor device, comprising, a casing having a piston bore, a non-pressure head secured to said casing over one end of said bore, a piston disposed to reciprocate in said bore, a rod carried by said piston and having a bearing in said non-pressure head and being movable with said piston, a coil spring encircling said rod and spaced therefrom, one end of said spring bearing against said piston and the opposite end of said spring bearing against said non-pressure head, and means for supporting said spring in said bore in concentric relation with said rod comprising a sleeve disposed in said bore and encircling said spring in substantial contact therewith, and means carried by said casing and non-pressure head supporting said sleeve in a fixed position in said device in concentric relation with said rod.

2. A fluid pressure motor device, comprising, a casing having a piston bore, a non-pressure head secured to said casing over one end of said bore, a piston disposed to reciprocate in said bore, a rod carried by said piston and having a bearing in said non-pressure head and being movable with said piston, a coil spring encircling said rod and spaced therefrom, one end of said spring bearing against said piston and the opposite end of said spring bearing against said non-pressure head, and means for supporting an intermediate portion of said spring in concentric relation with said rod comprising a sleeve encircling said portion of said spring in substantial contact therewith, and means supporting said sleeve in a fixed position in said device in concentric relation with said rod, the opposite ends of said sleeve being flared outwardly for guiding said spring into said sleeve upon reciprocation of said piston.

3. A fluid pressure motor device, comprising, a casing having a piston bore, a non-pressure head secured to said casing over one end of said bore, a piston disposed to reciprocate in said bore, a rod carried by said piston and having a bearing in said non-pressure head and being movable with said piston, a coil spring encircling said rod and spaced therefrom, one end of said spring bearing against said piston and the opposite end of said spring bearing against said non-pressure head, and means for supporting an intermediate portion of said spring in concentric relation with said rod comprising a sleeve encircling said portion of said spring in substantial contact therewith, and means carried by said casing and non-pressure head supporting said sleeve in concentric relation with said rod.

4. A fluid pressure motor device, comprising, a casing having a piston bore and having at one end of said bore an outwardly extending flange, a non-pressure head having one end mounted against said flange, bolts extending through said one end of said non-pressure head and said flange rigidly securing same together, a piston mounted to reciprocate in said bore, a piston rod projecting from one face of said piston and slidably mounted in a bearing in said non-pressure head, a coil spring encircling said rod and spaced therefrom, one end of said spring bearing against said non-pressure head and the opposite end bearing against said piston for urging said piston in a direction away from said non-pressure head, means associated with said piston and non-pressure head for supporting the opposite ends of said spring in substantial concentric relation with said rod, a sleeve encircling said spring in substantial contact with a portion thereof intermediate its ends, and means clamped between said flange and non-pressure head by said bolts and supporting said sleeve in a fixed position concentric to said rod to thereby maintain said portion of said spring in substantial concentric relation with said rod.

5. A fluid pressure motor device, comprising, a casing having a piston bore and having at one end of said bore an outwardly extending flange, a non-pressure head having one end mounted against said flange, bolts extending through said one end of said non-pressure head and said flange rigidly securing same together, a piston mounted to reciprocate in said bore, a piston rod projecting from one face of said piston and slidably mounted in a bearing in said non-pressure head, a coil spring encircling said rod and spaced therefrom, one end of said spring bearing against said non-pressure head and the opposite end bearing against said piston for urging said piston in a direction away from said non-pressure head, means associated with said piston and non-pressure head for supporting the opposite ends of said spring in substantial concentric relation with said rod, a sleeve encircling said spring in substantial contact with a portion thereof intermediate its ends, and means clamped between said flange and non-pressure head by said bolts and supporting said sleeve in a fixed position concentric to said rod to thereby maintain said portion of said spring in substantial concentric relation with said rod, said sleeve and the means for supporting same comprising a plurality of arcuate shaped sections arranged in end to end abutting relation.

6. A brake cylinder device comprising a casing having a piston bore, a piston in said bore, a non-pressure head having one end secured to said casing and having centrally through its opposite end a rod bearing, a rod connected to said piston and extending through said bearing, a coil release spring encircling and spaced from said rod and supported at one end by said piston and at the opposite end at the said opposite end of said non-pressure head, and means associated with said non-pressure head and extending into said bore and spaced from the wall thereof for engagement by said spring to maintain said spring out of contact with said rod.

7. A brake cylinder device comprising a casing having a piston bore, a piston in said bore, a non-pressure head having one end secured to said casing and having centrally through its opposite end a rod bearing, a rod connected to said piston and extending through said bearing, a coil release spring encircling and spaced from said rod and supported at one end by said piston and at the opposite end by the said opposite end of said non-pressure head, and means carried by said casing and said non-pressure head and projecting into proximity with said spring for engagement thereby to maintain said spring out of contact with said rod.

8. A brake cylinder device comprising a casing having a piston bore, a piston in said bore, a non-pressure head having one end secured to said casing and having centrally through its opposite end a rod bearing, a rod connected to said piston and extending through said bearing, a coil release spring encircling and spaced from said rod and supported at one end by said piston and at the opposite end at the said opposite end of said non-pressure head, and means associated with said non-pressure head projecting into said bore and into said non-pressure head and spaced from the wall of said bore for engagement by said spring to support same out of contact with said rod.

GEORGE C. FARMER.